UNITED STATES PATENT OFFICE.

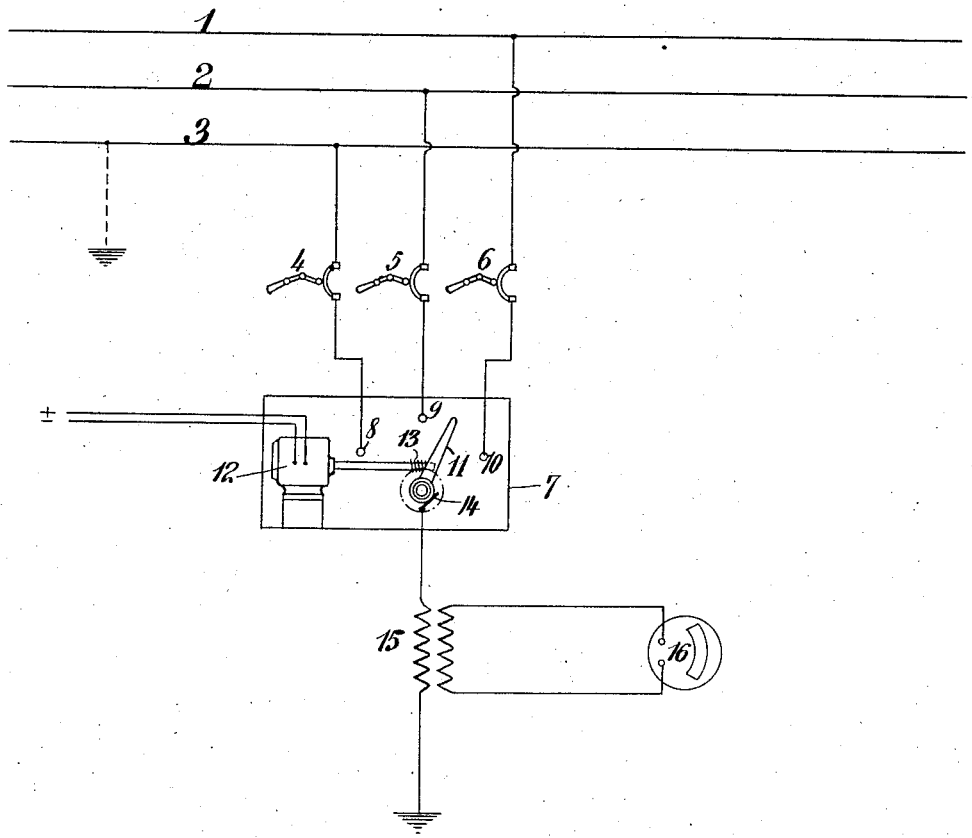

GEORGE AUGUSTUS BURNHAM, OF CLIFTONDALE, MASSACHUSETTS, ASSIGNOR TO SEARS B. CONDIT, JR., OF BROOKLINE, MASSACHUSETTS.

ELECTRIC GROUND-DETECTOR.

1,055,018.  Specification of Letters Patent.  Patented Mar. 4, 1913.

Application filed March 1, 1911. Serial No. 611,663.

*To all whom it may concern:*

Be it known that I, GEORGE A. BURNHAM, a citizen of the United States, residing at Cliftondale, in the county of Essex and State of Massachusetts, have invented certain new and useful Improvements in Electric Ground-Detectors, of which the following is a full, clear, and exact specification.

This invention relates to means for indicating or recording a ground on an electric circuit, the object being to provide a ground detector which will be a common instrument for a plurality of lines and which will automatically test any one of said lines several times a minute and will admit of discriminating or selecting the grounded wire by the use of a series of selector switches. Devices of this kind are ordinarily electrostatic in character when used in connection with high potential circuits.

Experience has shown that ground detectors based on electrostatic principles give erroneous readings on account of the fact that they are influenced not only by the dynamic ground, but also, and principally, by static influences which in reality may not be considered as detrimental to the operation of the system.

Electromagnetic devices are employed on low potential circuits which require a separate instrument for each line or a common instrument may be employed which the attendant may transfer from one circuit to the other.

It has been found in practice that the testing of the grounds on a distribution system when left to the discretion of the operator has resulted in serious accidents to life and property on account of the fact that a ground might occur immediately after the attendant had tested the line, and, as a general rule, a ground being tested several times a day the trouble would not be indicated until the operator had made the next test on the system. This may have been a period of several hours and in each case the wire may have dropped into the street or a serious ground occurred which has proven so disastrous in many cases, especially on high potential systems. Under my invention, however, a single indicating or recording instrument is used which is in continuous service, but during such service in an intermittent manner continuously tests each of the lines connected with the device such that if a ground occurs on the aforesaid wires an indication which may be either visual or audible is obtained.

In circuit with the common ground wire is a transformer which is automatically connected or disconnected to the several lines, the secondary of the transformer being connected to either an indicating or recording instrument. In series with the transformer are placed several elimination switches, affording means by which the grounded wire may be easily selected. I maintain a contact brush in continuous movement by means of an electric motor or other suitable driving mechanism and place in its path a series of fixed contacts corresponding to the several wires to be tested. From a ring contact secured to the brush I lead a ground wire in which I insert the primary of a potential transformer, in the secondary of which may be placed a lamp or indicating or recording instrument of any desired character. Thus a single instrument may serve any number of line wires with the minimum consumption of energy since an instantaneous contact merely is required while the brush passes over the several contacts and the circuit is connected with ground over a high resistance path through the potential transformer.

My invention therefore consists of a ground detector adapted to intermittently place an indicating or recording device in circuit with a group of electric distribution lines through a ground branch including protective resistance, combined with a means for switching each of the lines in and out of the circuit at will.

A further distinctive feature of my invention is that instead of producing a slight change in the intensity of light or the displacement of the needle on the indicating instrument I produce a series of flashes—flashes of light or pulsating swings of the indicating needle, which is much more effective in attracting the attention of the operator than the aforementioned method. Furthermore, testing of the lines does not become part of the operator's work and is going on continuously as long as the system is in operation.

In the accompanying drawing which illustrates my invention 1, 2 and 3 represent bus-bars connected with the lines of the distribution circuit. I have indicated three such lines but any desired number may be used. From each bus-bar is a branch circuit including elimination switches 4, 5, 6. Several branches terminate on a panel of insulating material 7, on which are contact studs 8, 9, 10, as many as there are lines, and fixed in position on an arc of a circle. Preferably I immerse these contacts in oil, as I find this medium much more effective in maintaining the contacts in good condition. A brush arm 11 driven by a small electric motor 12 from a local source of supply by a worm gear 13 is mounted on the panel, the brush axis of revolution being in the center of a circle bounding the contacts. A brush 14 bears on a metallic hub connected with a brush 11 and connects with a ground through the primary of a potential transformer 15, the secondary of which includes an indicating or recording instrument 16 of any desired kind. This may be a lamp or a voltmeter or a device such as an electric bell. I have shown in the diagram a voltmeter.

With a ground detector as thus described, if a ground occurs on any line of the system, the attendant will at once note a series of pulsations of the indicating needle or flashes of the lamp if a lamp is used for the indicating device. Thus it will be noted that the distribution circuits are not in normal condition and by the use of the elimination switches 4, 5, 6, the grounded wire may be located. When the line is in normal condition and no grounds are present on any part of the system there will be no indication whatever in the indicating device.

Having thus described my invention, what I claim as new and desire to secure by Letters Patent is:—

1. The combination with the supply mains for a distribution circuit, of a ground detector, said ground detector comprising a lead from each of said mains, stationary contacts, one for each of said leads and connected therewith, a movable brush arm successively engaging said contacts, a path to ground connected to said brush arm, an indicating device responsive to flow and cessation of flow of current in said path, and a switch for each of said leads adapted to open and close the same independently of the closing and opening of the switches in the other leads, the continuity of said distribution circuit being independent of said switches.

2. The combination with the supply mains for a distribution circuit, of a ground detector, said ground detector comprising a lead from each of said mains, stationary contacts, one for each of said leads and connected therewith, a movable brush arm successively engaging said contacts, a motor for driving said brush, a potential transformer having its high resistance winding connected between said brush and ground, an indicating instrument in the secondary circuit of the transformer, said instrument being responsive to flow and cessation of flow of current in said transformer, and a switch for each of said leads adapted to open and close the same independently of the closing and opening of the switches in the other leads, the continuity of said distribution circuit being independent of said switches.

In testimony whereof I affix my signature, in presence of two witnesses.

GEORGE AUGUSTUS BURNHAM.

Witnesses:
AUSTIN E. GREENE,
C. C. BADEAU.